(12) United States Patent
Sterken et al.

(10) Patent No.: US 6,657,611 B1
(45) Date of Patent: Dec. 2, 2003

(54) WHITE COLOR SELECTION OF DISPLAY INFORMATION

(75) Inventors: Antoon Joseph Elisabert Sterken, Eindhoven (NL); Giovanni Lonoce, Lissone (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/566,973

(22) Filed: May 9, 2000

(30) Foreign Application Priority Data

May 12, 1999 (EP) .............................. 99201476

(51) Int. Cl.⁷ ................................. G09G 3/36
(52) U.S. Cl. ...................... 345/101; 345/22; 345/88; 345/106; 345/589
(58) Field of Search ................. 345/101, 106, 345/22, 87, 88, 589; 349/72, 99; 359/86

(56) References Cited

U.S. PATENT DOCUMENTS

| | | | | |
|---|---|---|---|---|
| 5,400,086 A | * | 3/1995 | Sano et al. ................. | 348/678 |
| 5,619,229 A | * | 4/1997 | Kumaki ....................... | 345/690 |
| 5,748,171 A | * | 5/1998 | Ishizaki et al. ............. | 345/101 |
| 5,852,430 A | * | 12/1998 | Endo ........................... | 345/101 |
| 5,920,358 A | * | 7/1999 | Takemura ................... | 345/603 |
| 5,937,089 A | * | 8/1999 | Kobayashi .................. | 382/167 |
| 6,025,823 A | | 2/2000 | Choi ........................... | 345/101 |
| 6,088,059 A | * | 7/2000 | Mihara et al. .............. | 348/335 |
| 6,243,068 B1 | * | 6/2001 | Evanicky et al. ........... | 345/102 |
| 6,337,922 B2 | * | 1/2002 | Kumada ...................... | 382/162 |
| 6,373,531 B1 | * | 4/2002 | Hidaka et al. .............. | 348/603 |
| 6,417,863 B1 | * | 7/2002 | Smith .......................... | 345/590 |

FOREIGN PATENT DOCUMENTS

JP 6470734 A 3/1999 ........... G03B/27/32

* cited by examiner

Primary Examiner—Michael Razavi
Assistant Examiner—Daniel J Chung
(74) Attorney, Agent, or Firm—Edward W. Goodman (57) ABSTRACT

A system of a computer (PC) and a monitor (DA) enables a user to select a desired white color temperature of display information displayed on a display device (DD) of the monitor (DA). The computer (PC) includes a graphics adapter (GA) for supplying video signals (Ri, Gi, Bi) to monitor (DA). The monitor includes controllable amplifiers for amplifying the video signals (Ri, Gi, Bi) to obtain video drive signals (Ro, Go, Bo) driving the display device (DD). A ratio of values of the video drive signals (Ro, Go, Bo) determines the color displayed. The computer (PC) is programmed to: (i) control the graphics adapter (GA) for generating display information which obtains a graphical representation (L; T) of various colors, and a graphical indication (I; Pl) for graphically indicating white colors in the graphical representation (L; T), and (ii) receive a user command (UC) indicating a selected color (Co) in the graphical representation (L; T). The video drive signals (Ro, Go, Bo) are corrected with a correction ratio which is determined on the basis of the selected color (Co) for displaying the display information in the white color temperature indicated by the color (Co), only if said selected color (Co) lies on or near said graphical indication (I; Pl).

13 Claims, 5 Drawing Sheets

WHITE COLOR SELECTION OF DISPLAY INFORMATION

BACKGROUND OF THE INVENTION

1. Field of the Invention

The invention relates to a method of selecting a white color temperature of display information to be displayed on a color display device. The invention further relates to a computer programmed for selecting a white color temperature of display information, and to a system and a monitor for selecting a white color temperature of display information.

2. Description of the Related Art

It is known from the trichromatic theory of color vision, that it is possible to generate various colors by mixing three primary colors in various amounts. The various colors can be shown in a color triangle of which the vertices are the primary colors. Often, this color triangle is represented in the well-known chromaticity diagram. The chromaticity diagram shows various monochromatic lights of the spectrum and certain other points as given by their values x and y. The ordinate is the fractional amount of the y primary and the abscissa is the fractional amount of the x primary in any color designated by a point on the diagram. No provision on the diagram is necessary for the third primary z, since it is always true that x+y+z=1 and, consequently, the chromaticity is uniquely determined by x and y. The so-called white point on the diagram is the result of equal amounts of x, y, and z.

Philips Electronics makes a commercially available 17-inch monitor, known as the Brilliance 107, which is supplied together with customax software.

The monitor comprises a video-processing circuit which comprises three controllable amplifiers for amplifying the RGB video signals supplied by a computer with a desired amplification factor. The amplified video signals are supplied as video drive signals to a color display device of the monitor to display the display information. As the hues of colors displayed are determined by ratios of values of the video drive signals, it is possible to alter the hue by correcting the amplification factors of the controlled amplifiers with a correction ratio.

After the customax software has been installed on a PC connected to the monitor, it is possible to open a window wherein a color triangle is displayed. The user can point, with a mouse connected to the computer, to any color in the color triangle. When the customer activates a mouse button, the color pointed to will be selected as the white color of the monitor. The computer sends information to the monitor determining the correction ratio to be applied on the amplification factors of the controllable amplifiers to obtain corrected values of the video drive signals so that white is displayed as the color pointed to. The same correction ratio will be used for all other colors too. In this way, the user is able to select a white color of the display which is in accordance with his personal liking. If the user selects a bluish white, the picture will have a cool appearance, if the user selects a reddish white, the picture will have a warm appearance. It is a drawback of this white color adjustment that it is difficult to select a white or near-white color in the color triangle. This often results in a poor representation of the color hues and thus in a long-lasting iterative process of finding a white color which is to the user's liking.

SUMMARY OF THE INVENTION

It is, inter alia, an object of the invention to provide a white color selection allowing an easy selection of white colors.

To this end, a first aspect of the invention provides a method of selecting a white color temperature of display information. A second aspect of the invention provides a system for selecting a white color temperature of display information. A third aspect of the invention provides a computer which performs such a method. A fourth aspect of the invention provides a monitor incorporating such a system.

The invention is concerned with a white color selection of information to be displayed on a display device of a display apparatus. The invention is particularly relevant for a monitor connected to a computer. The computer supplies video signals to the monitor. A video-processing circuit in the monitor amplifies these video signals to obtain video drive signals supplied to the display device, while a ratio of values (amplitudes) of the drive signals determines the color displayed by the display device.

The invention is based on the recognition that it is far easier to select a white color temperature of the display information if, in the graphical representation of the colors (for example, the color triangle of the prior art), the colors which are defined as white or near-white are graphically indicated. For example, such a graphical indication may be Planck's curve, or a closed curve surrounding an area of white and near-white colors. The curve may also be formed of separate points or other symbols. It is detected whether the user selects a white color which is on or near the graphical indication of the colors, and only if this condition is met, the values of the drive signals will be corrected in accordance with the correction ratio. The amplitudes of the drive signals determine the amount of light generated by the corresponding primary colors of the display device. In a cathode ray tube, the primary colors are determined by the color points of phosphors, while in a liquid crystal display, the primary colors are determined by color filters. A selected color is on or near the graphical indication if the selected color is on or near Planck's curve, or if the selected color is on or within the closed curve. "Near" should be interpreted as having a distance to the graphical indication in the graphical representation which is less than a predetermined value, or as having coordinates which differ not more than a predetermined value from the color coordinates of the colors represented by the graphical indication.

Plank's curve as such is known. The white color temperature of a solid surface, for example, a lamp filament or the screen of a cathode ray tube, is the temperature of a so-called black body from which the radiant energy has essentially the same spectral distribution as that of the surface. These white colors are located on the Planck's curve and are designated with the temperature of the black body resulting in the corresponding white color.

In an embodiment of the invention, a computer comprises a video-generating circuit (often referred to as graphics adapter) and a central processing unit or microprocessor. The graphics adapter supplies the video signals, while the microprocessor controls the graphics adapter to supply the graphical representation and the graphical indication. If the microprocessor detects that a user command indicates a color on or near said graphical indication, the computer sends a correction ratio to the monitor. The monitor comprises a video-processing circuit with the controllable amplifiers, one for each of the video signals supplied by the computer, to supply the video drive signals to the display device. The correction ratio determines a ratio of amplification factors of the controllable amplifiers.

A further embodiment of the invention differs from the above embodiment of the invention in that the computer sends information determining the user-selected color (for example, the x and y chromaticity coordinates) to a calculating circuit in the monitor. This calculating circuit calculates the correction ratio from this information.

An aspect of the invention defines a computer which controls the graphics adapter in such a way that the video signals supplied by the computers are corrected with the correction ratio. For example, the microprocessor calculates corrected values of video information sent to the graphics adapter in accordance with the correction ratio, or the microprocessor supplies the correction ratio to the graphics adapter and the graphics adapter corrects the video information received from the microprocessor.

In an embodiment of the invention, information on the ratios of the drive signals required to display white colors on a specific monitor or monitor type is used to calculate the ratios. In this way, it is possible to accurately reach the white color intended. This becomes increasingly important now that computers are used more and more with applications (for example, photographic applications) in which a true color reproduction is required. The information on the ratios of the drive signals required to display white colors may be provided as software data to be loaded into the computer from a memory. It is also possible to load the software data from the display apparatus via a data interface between the display apparatus and the computer. This data interface may be a separate data bus, or an existing interface which is used also to transport the basic information (the drive signals Ri, Gi, Bi, and synchronization signals) from the computer to the monitor. In the latter case, the data may be encoded on the video or synchronization signals.

In an embodiment of the invention, the information on the ratios consists of a few coefficients only. The coefficients determine a polynomial which represents the drive voltages as a function of the white temperature of the white colors. The computer calculates the required ratios of the drive signals from the functions calculated from the coefficients received.

These and other aspects of the invention are apparent from and will be elucidated with reference to the embodiments described hereinafter.

DESCRIPTION OF THE PREFERRED EMBODIMENTS

Figure 1:
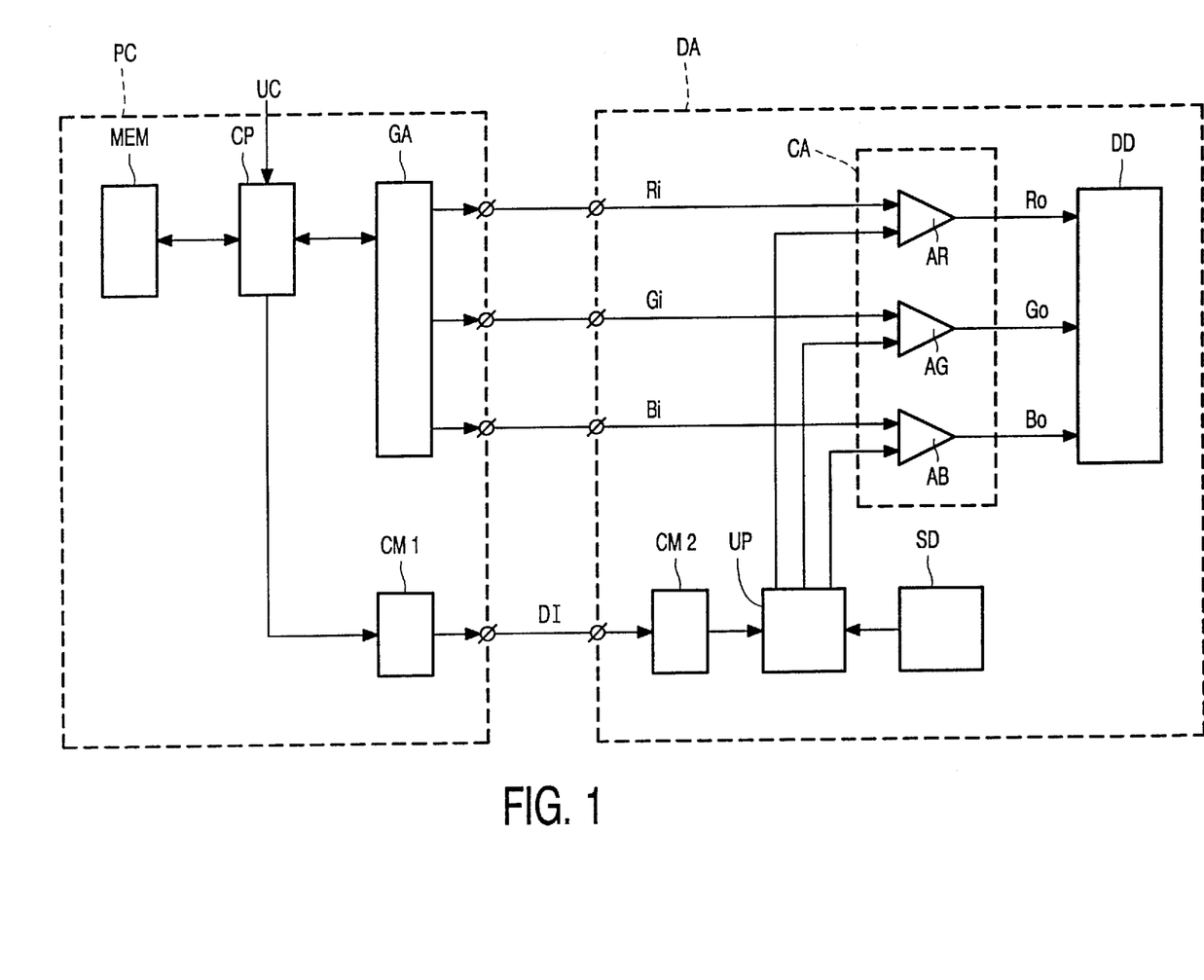
FIG. 1 shows a system of a computer and a display apparatus in accordance with the invention.
Figure 2:
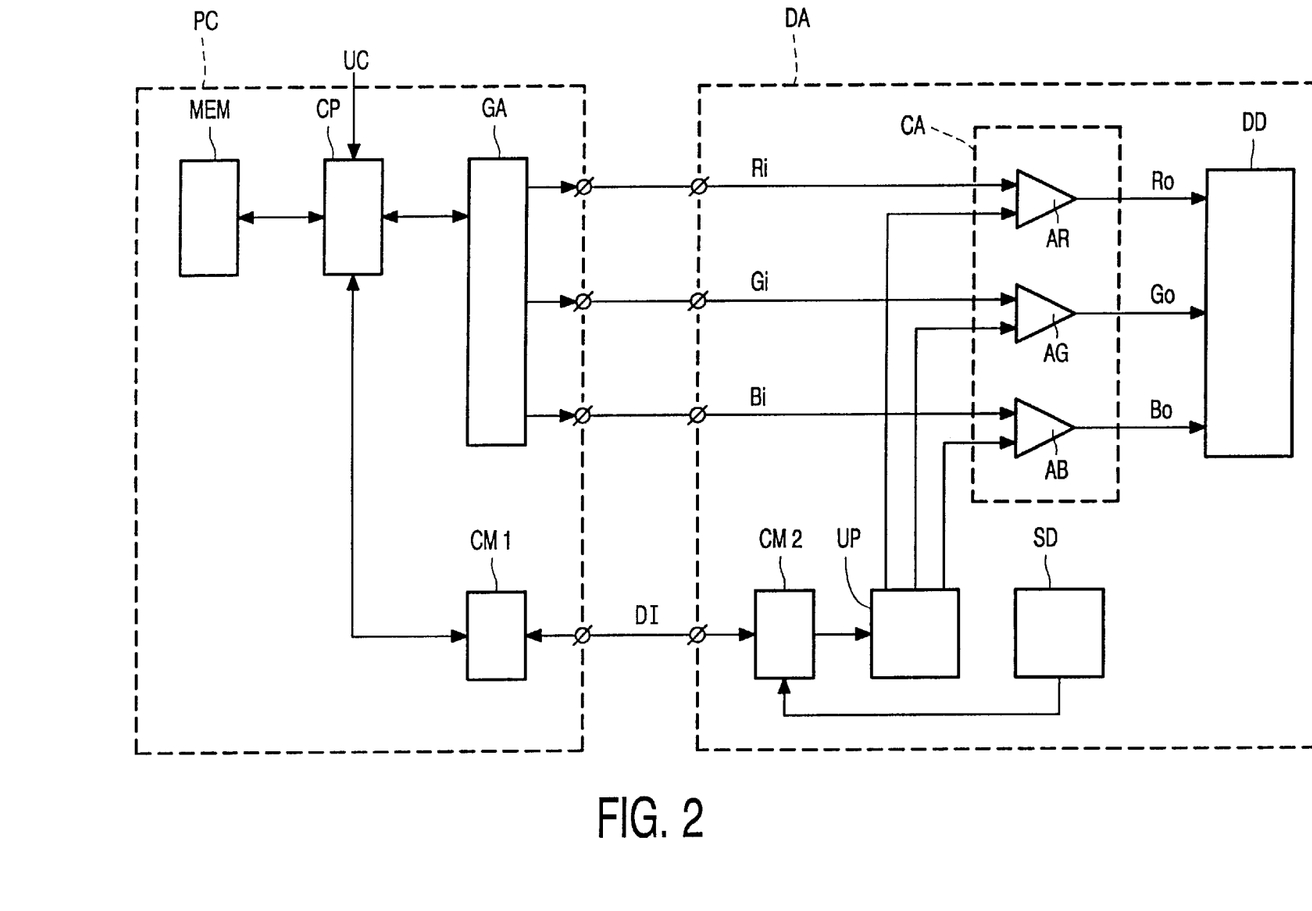
FIG. 2 shows another system of a computer and a display apparatus in accordance with the invention.
Figure 3:
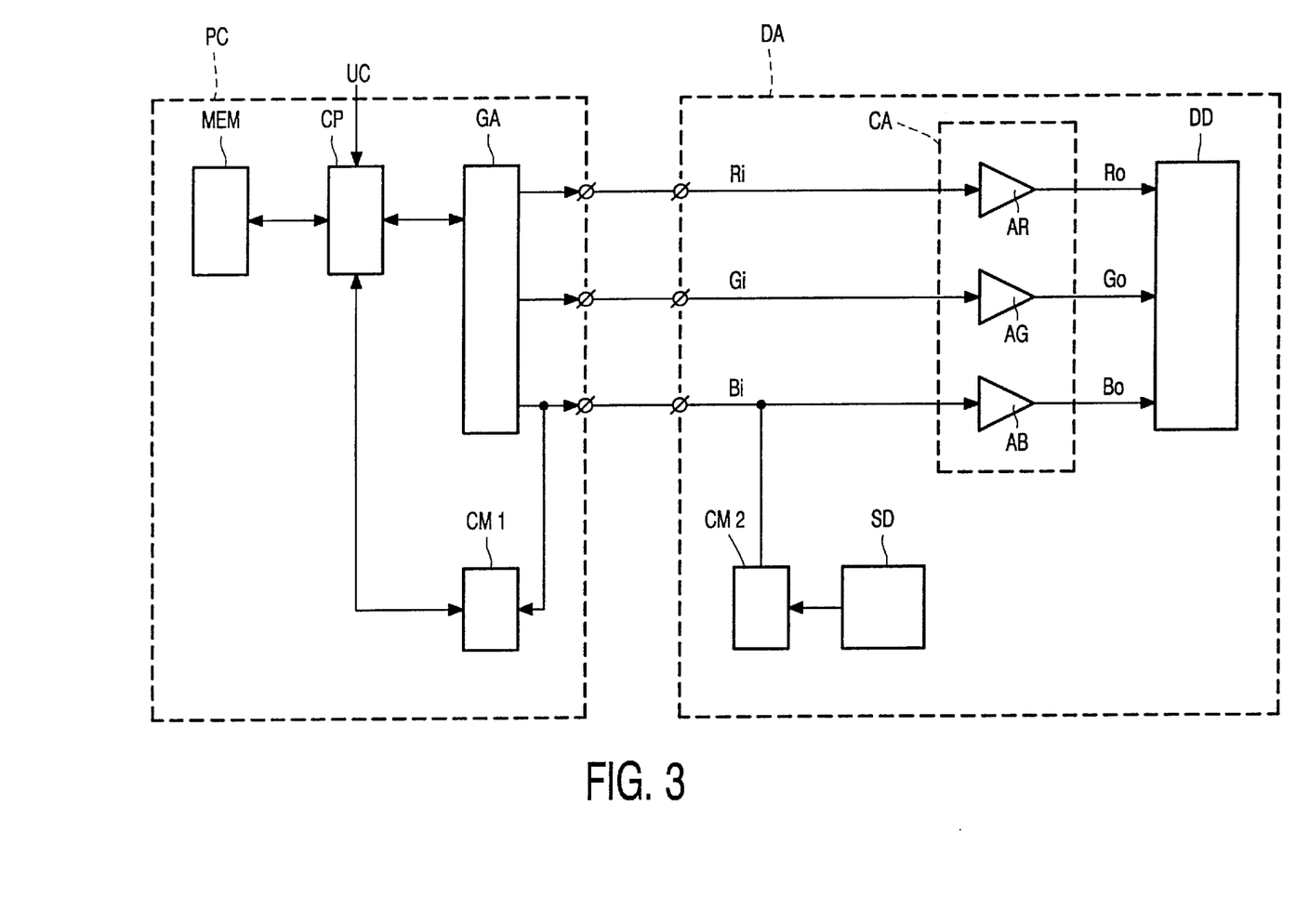
FIG. 3 shows yet another system of a computer and a display apparatus in accordance with the invention.

FIGS. 1, 2 and 3 each show a system of a computer PC and a display apparatus DA in accordance with the invention. The computer PC comprises a central processing unit CP, a memory MEM and a graphics adapter GA. The graphics adapter GA is controlled by the central processing unit CP to supply video signals Ri, Gi, Bi to the display apparatus DA so as to display information on a color display device DD of the display apparatus DA. Usually, the video signals consist of a red Ri, a green Gi, and a blue Bi video signal which correspond to the primary colors of the display device DD. The display apparatus comprises a video-processing circuit CA with three controllable amplifiers AR, AG, AB. The controllable amplifiers AR, AG, AB receive the video signals Ri, Gi, Bi, respectively, and supply the video drive signals Ro, Go, Bo to the display device DD, respectively. The actual color displayed depends on the ratio of the levels of the three video drive signals Ro, Bo, Go. It is common practice that the display apparatus DA is arranged to display a certain white color if the three video signals Ri, Gi, Bi have the same amplitude. This certain white color is usually selected to be white D (see FIG. 4 for some examples: D55, D65, D75). As individual users may prefer different white colors or white temperatures of the information displayed, provisions for altering the white temperature are often available. For example, warm colors are appreciated in countries with a cold climate. Warm colors are obtained when the white temperature selected is lower, in other words, the white color selected is more reddish.

The memory MEM of the computer PC may contain a program code determining the activities of the central processing unit CP, and data to be processed. The program code may control the central processing unit CP to generate a graphical representation of various colors L; T via the graphics adapter GA. This graphical representation L; T may be presented in a separate window, and may consist of color triangle T as is shown in the chromaticity diagram L shown in FIG. 4. The central processing unit CP receives a user command UC, for example,from a pointer device such as a mouse. The central processing unit CP processes the user command UC in such a way that the user is able to, indicate a position Po in the graphical representation L; T for selecting a color Co which the user desires to be the white color used for displaying the display information on the display device DD. The color Co may actually be selected by pressing a mouse button. After the user has selected, in the graphical representation L; T, the color Co to be used as the white color, in FIGS. 1 and 3, the central processing unit CP calculates correction ratios by which the video signals Ri, Gi, Bi have to be multiplied to obtain the correct ratios of the video drive signals Ro, Go, Bo. These correction ratios are calculated in such a way that the selected color Co occurs when white information should be displayed. All other colors in the information will be corrected with these ratios, too. In FIG. 2, the PC sends information DI determining the selected color Co to the monitor. The monitor further comprises a microprocessor UP which receives this information DI and calculates the correction ratio.

In FIG. 1, the ratio of the levels of the video signals Ri, Gi, Bi is preferably controlled by the microprocessor UP, which receives the correction ratio from the computer PC. It is not required to use the microcomputer UP, because it is also possible to use dedicated hardware to transform the correction ratio supplied by the computer into control signals suitable to control the amplification factors of at least two of the controllable amplifiers AR, AG, AB.

In FIG. 2, the microprocessor UP receives the information determining the selected color Co (for example, the x and y coordinates in the chromaticity diagram) and calculates the corrected ratio with which the amplification factors of the controllable amplifiers AR, AG, AB have to be set.

In FIG. 3, the central processing unit CP generates video information which is corrected in accordance with the correction ratio before it is sent to the graphics adapter GA, or the corrected ratio is supplied to the graphics adapter GA.

Now the ratio of the video signals Ri, Gi, Bi is already corrected, and consequently no correction is required in the monitor DA.

The invention is based on the recognition that the user should be restricted in selecting white colors or temperatures to prevent the user from selecting a color to be used as the white color which is so far away from white that the information will be displayed in unnatural colors. This is achieved by graphically indicating(I; Lp) which colors are considered to be practical white colors in the graphical representation of the colors L; T. The computer only changes the ratios of the video drive signals Ro, Bo, Go (FIGS. 1 and 2) or the video signals Ri, Gi, Bi (FIG. 3) if a color is selected which corresponds to the indicated white colors. The graphical indication I; Lp may be in the form of a curve, such as Planck's curve Lp shown in FIG. 4, or with symbols, such as the crosses in FIG. 4. It is also possible to indicate an area of practical white colors, for example, with a loop I.

As an example, this will be further elucidated in the situation as shown in FIG. 1, wherein the standard white color occurs at equal amplitudes of the three video signals Ri, Gi, Bi. Thus, when the system is arranged to display the information in the standard white color, a predetermined color (for example, an unsaturated magenta) is displayed when the three video signals have a ratio of amplitudes defined by Ri:Gi:Bi=0.5:0:0.5. If the user selects a particular lower color temperature (more reddish colors), the computer PC adapts the amplification factors of the controllable amplifiers AR, AG, AB so that the amplitudes of the video signals Ri, Gi, Bi are corrected to obtain video drive signals Ro, Go, Bo which cause this selected white color with the lower color temperature. The corrected amplitudes are obtained, for example, by multiplying the video signals Ri, Gi, Bi by the ratios 1:0.9:0.9 instead of 1:1:1. Thus, if the computer has to display white, the amplitudes of the video drive signals Ro, Go, Bo will now be corrected to become Ro, 0.9*Go, 0.9*Bo, and for the particular color, the amplitudes of the drive signals will be corrected to become 0.5*Ro, 0*0.9*Go, 0.5*0.9*Bo.

The system may further comprise a data interface DI between the computer PC and the display apparatus DA. In FIGS. 1 and 2, this data interface DI is shown to be a separate bus which at least transports data from the computer PC to the monitor DA to enable control of the amplification factors. The data interface may also be used to transport information from the monitor DA to the computer PC. The data interface may be an already existing connection between the computer PC and the monitor DA. FIG. 3 shows, by way of example, the data interface as an existing connection between the computer PC and the monitor DA. The optional data interface shown in FIG. 3 only transports data from the monitor DA to the computer PC.

To accommodate the data transport, the computer PC comprises an interface circuit CM1 and the monitor comprises an interface circuit CM2. The interface circuits CM1, and CM2 may be buffers when the data is transported over a separate interface, or the interface circuits CM1, CM2 may comprise encoders and decoders to transport the data over an existing interface. For example, the data may be encoded on the video signal during a blanking period.

The display apparatus DA may further comprise a storage device SD for storing information about the amplitudes of the video drive signals Ro, Go, Bo required to display colors with different white color temperatures. In FIGS. 1 and 3, the central processing unit CP of the computer PC retrieves the stored data via the data interface DI and uses the stored data in calculating the correction ratio. This is further elucidated with respect to FIG. 5.

The video-processing circuit CA may comprise controlled amplifiers AR, AG, AB, which may receive user commands via the microprocessor UP, for example, to control the brightness and the contrast of the displayed information.

Figure 4:
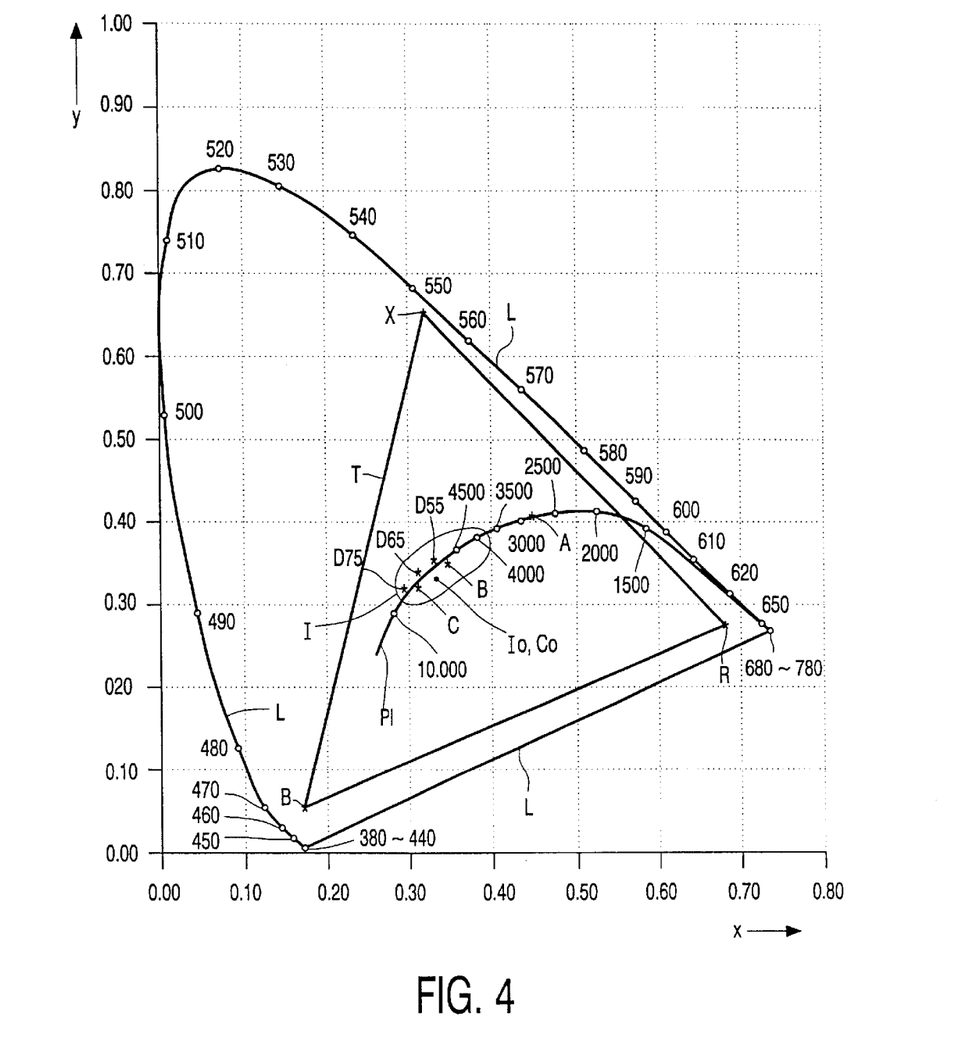
FIG. 4 shows a chromaticity diagram with a color triangle, Planck's curve and other white colors.

FIG. 4 shows a chromaticity diagram with a color triangle, Planck's curve and other white colors. The chromaticity diagram shows a loop or locus L of pure spectral colors in an x/y plane. Every pure spectral color is identified by its wavelength. Blue colors have a wavelength of 450 to 482 nm, green colors have a wavelength of 497 to 530 nm, and red colors have a wavelength of 620 to 780 nm. These pure spectral colors are fully saturated, which means that they are not mixed with other pure spectral colors. Less saturated colors are obtained by mixing pure spectral colors. These less saturated colors are represented inside the locus L.

If information is displayed on a display device DD using three primary colors R, G, B, the colors that can be displayed by this display are represented by a color triangle T of which the primary colors R, G, B are the vertices. FIG. 4 shows an example of such a color triangle T. The most saturated colors are positioned on the lines connecting the primary color points R, G, B, less saturated colors are situated inside the color triangle T. FIG. 4 further shows Planck's curve Pl representing the white light radiated by a black body having the temperature in Kelvin as denoted along Planck's curve Pl. Further, some other white points are indicated by crosses and denoted by internationally agreed symbols (A, B, C, D55, D65, D75). As an example, a standard light source with white C represents the average, somewhat bluish daylight in the Northern hemisphere with a color temperature of about 6500 K.

Figure 5:
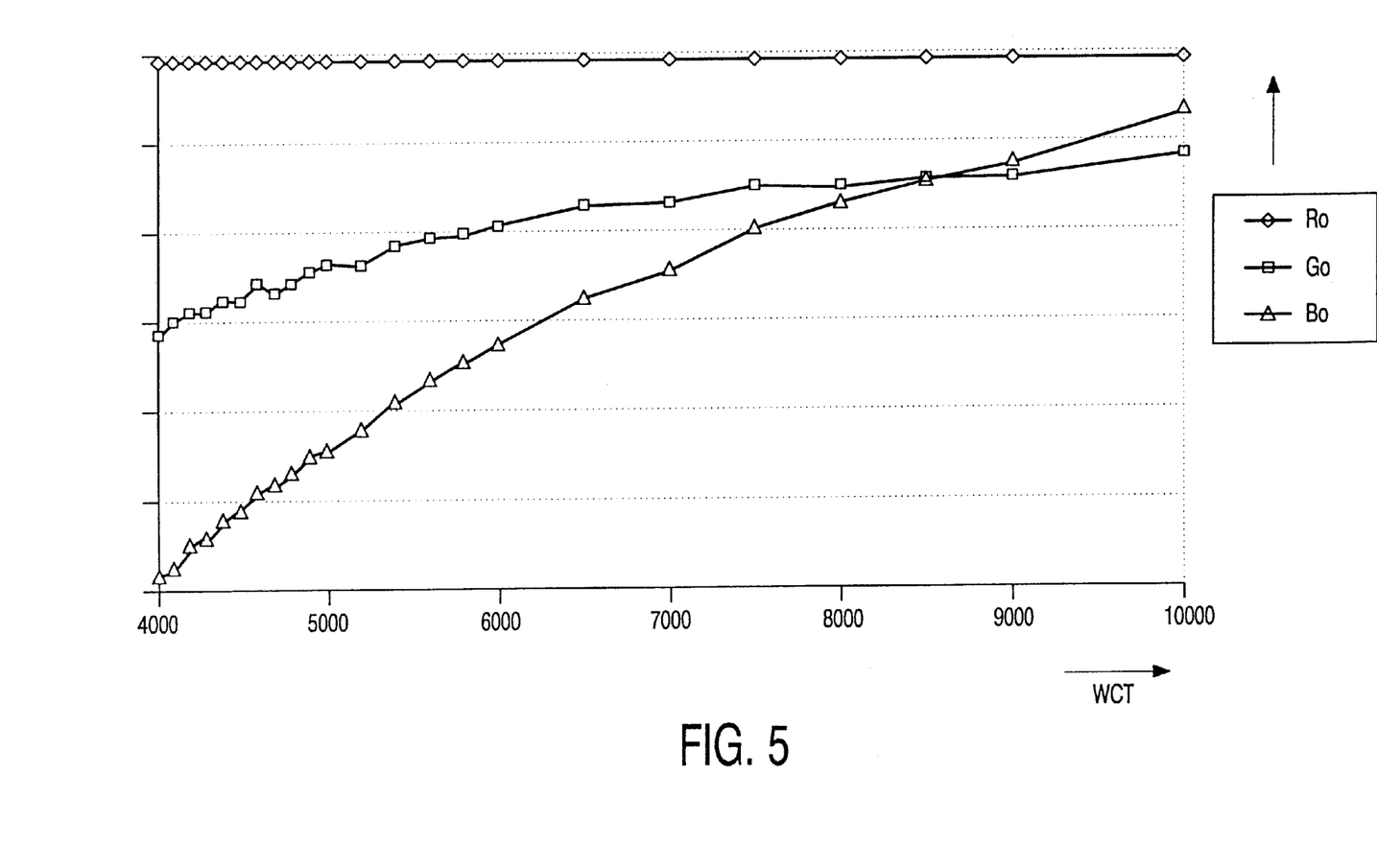
FIG. 5 shows an example of the drive voltages as a function of the white temperature.

FIG. 5 shows an example of the video drive voltages Ro, Go, Bo as a function of the white color temperature of the resulting color displayed on a specific display apparatus DA. The line indicated with diamonds shows the amplitude of the red video drive signal Ro, which amplitude is selected to be constant in this example. The line indicated with squares shows the amplitude of the green video drive signal Go. The line indicated with triangles shows the amplitude of the blue video drive signal Bo. The system is only able to set the white temperature with a reasonable accuracy when the computer PC knows which ratio of the video drive signals Ro, Bo, Go is required to display desired white colors. Therefore, preferably, data on these ratios should be available to the computer PC. The data may be supplied by the display apparatus manufacturer on a storage medium readable by the computer PC, such as a floppy disk, or they may be stored in a storage device SD of the display apparatus DA. In the latter case, the computer PC can retrieve the data via the data interface DI between the display apparatus DA and the computer PC.

The data may consist of groups of values, each group comprising the three video drive voltages Ro, Go, Bo required to display a specific white color temperature. It is possible to lower the amount of data by approximating the curves of the required video drive voltages Ro, Go, Bo with polynomial functions of which the coefficients only need to be known. As an example, in a practical embodiment in which the display device DD is a cathode ray tube, a fourth-order polynomial with five coefficients appeared to provide very satisfactory results. It is sufficient when the computer is provided with these coefficients only, and with software for calculating the values of the drive voltages required at a desired white color temperature from these coefficients with the corresponding polynomial function.

It should be noted that the above-mentioned embodiments illustrate rather than limit the invention, and that those skilled in the art will be able to design many alternative embodiments without departing from the scope of the appended claims. For example, the display device DD may be a cathode ray tube, a liquid crystal display, a plasma display, or a plasma-addressed liquid crystal display. The invention is also suitable for a system of a computer PC and a display apparatus DA which are combined in a single casing. In this situation, the microcomputer UP and the storage device SD may be omitted as the central processing unit CP and the memory MEM may take over this function.

The graphical representation of the colors may also be displayed in other ways than in the chromaticity diagram with a triangle T, it is sufficient to indicate an area around Planck's curve P1, for example with a closed line I, or by displaying the colors outside the indicated area inside the loop I with a lower amplitude than outside the loop.

In the claims, the word "comprise" or its conjugations does not exclude the presence of elements or steps other than those listed in a claim. The invention can be implemented by means of hardware comprising several distinct elements, and by means of a suitably programmed computer. In the device claim enumerating several means, several of these means can be embodied by one and the same item of hardware.

In summary, in a preferred embodiment of the invention, a system of a computer PC and a monitor DA enables a user to select a desired white color temperature of display information displayed on a display device DD of the monitor DA. The computer PC comprises a graphics adapter GA for supplying video signals Ri, Gi, Bi to monitor DA. The monitor comprises controllable amplifiers for amplifying the video signals Ri, Gi, Bi to obtain video drive signals Ro, Go, Bo driving the display device DD. A ratio of values of the video drive signals Ro, Go, Bo determines the color displayed. The computer PC is programmed to: i) control the graphics adapter GA for generating display information which obtains a graphical representation L; T of various colors, and a graphical indication I; PI for graphically indicating white colors in said graphical representation L; T, ii) receive a user command UC indicating a selected color Co in the graphical representation L; T. The video drive signals Ro, Go, Bo are corrected with a correction ratio which is determined on the basis of said selected color Co for displaying the display information in the white color temperature indicated by said color Co, only if said selected color Co lies on or near said graphical indication I; PI.

What is claimed is:

1. A method of selecting a white color temperature of display information on a color display device, the method comprising the steps:

supplying video drive signals to the color display device, color hues of the display information being determined by ratios of values of the video drive signals;

controlling the supplying step to supply a graphical representation of various colors in the display information;

receiving a user command indicating a use-selected color in said graphical representation;

calculating a correction ratio in dependence on the user selected color; and correcting said values of the video drive signals in dependence on said correction ratio for displaying the display information in the white color temperature indicated by said selected color, characterized in that the controlling step comprises the step:

adding a graphical indication to said graphical representation for graphically indicating white colors, and in that the receiving step comprises the step:

detecting whether said selected color lies on or near said graphical indication, the correcting step correcting said values only if said selected color lies on or near said graphical indication.

2. The method of selecting a white color temperature of display information as claimed in claim 1, characterized in that said graphical representation comprises a color triangle.

3. The method of selecting a white color temperature of display information as claimed in claim 2, characterized in that said graphical indication comprises Planck's curve for indicating white colors of a black body at several temperatures.

4. The method of selecting a white color temperature of display information as claimed in claim 1, characterized in that the controlling step further comprises the step:

collecting information on the ratios of the values of the video drive signals required to display white colors indicated by the graphical indication on a specific color display device, the correcting step using said collected information for correcting said values.

5. The method of selecting a white color temperature of display information as claimed in claim 4, characterized in that said information is collected in a display apparatus comprising the display device.

6. The method of selecting a white color temperature of display information as claimed in claim 4, characterized in that the information is collected in the form of coefficients of predefined functions, the coefficients determining how the ratios of the drive signals have to vary as a function of the desired white temperature.

7. A system for selecting a white color temperature of display information on a color display device, the system comprising:

video supply means for supplying video drive signals to the color display device, color hues of the display information being determined by ratios of values of the video drive signals;

control means for controlling the video supply means to supply a graphical representation of various colors in the display information;

means for receiving a user command indicating a user-selected color in said graphical representation;

calculation means for calculating a correction ratio in dependence on the user-selected color; and correction means for correcting said values of the video drive signals in dependence on said correction ratio for displaying the display information in the white color temperature indicated by said selected color, characterized in that the control means comprises means for adding a graphical indication to the graphical representation for graphically indicating white colors, and in that the means for receiving comprises means for detecting whether said selected color lies on or near said graphical indication, the correction means correcting said values only if said selected color lies on or near said graphical indication.

8. The system for selecting a white color temperature of display information as claimed in claim 7, characterized in that the system comprises a personal computer and a monitor, the personal computer comprising the video-generating means, and a microprocessor which comprises the control means, the receiving means, the calculation means, the adding means, and the detection means, the monitor comprising the video-processing means which comprises controllable amplifiers for receiving video input signals from the video-generating means to supply the video drive signals, the calculation means being coupled to the video-processing means for controlling an amplification factor of the controllable amplifiers in conformance with said correction ratio.

9. The system for selecting a white color temperature of display information as claimed in claim 8, characterized in that the system further comprises communication means for transporting data from the monitor to the calculation means, said data representing ratios of the video drive signals required to display the desired white colors on the color display device, said data being stored in a storage device of the color display apparatus, the calculation means comprising means for calculating said correction ratio based on said data.

10. The system for selecting a white color temperature of display information as claimed in claim 7, characterized in that the system comprises a personal computer and a monitor, the personal computer comprising the video-generating means, and a microprocessor which, in turn, comprises the control means, the receiving means, the adding means, and the detection means, the monitor comprising the calculation means and the video-processing means which, in turn, comprises controllable amplifiers for receiving video signals from the video-generating means to supply the video drive signals, the calculation means being coupled to said receiving means for receiving information determining said user-selected color to calculate said correction ratio, the calculation means further being coupled to the video-processing means for controlling an amplification factor of the controllable amplifiers in conformance with said correction ratio.

11. The system for selecting a white color temperature of display information as claimed in claim 10, characterized in that the monitor further comprises a storage device for storing data representing ratios of the video drive signals required to display the desired white colors on the color display device, the calculation means comprising means for calculating said correction ratio based on said data.

12. A computer comprising:

a graphics adapter for supplying video signals representing display information; and a central processing unit programmed to:
control the graphic adapter to supply a graphical representation of various colors in said display information,
process a user command indicating a user-selected color in said graphical representation,
calculate a correction ratio in dependence on the user-selected color, and
correct said values of the video signals in dependence on said correction ratio for displaying the display information in the white color temperature indicated by said selected color, characterized in that the central processing unit is further programmed to:
add a graphical indication to said graphical representation for graphically indicating white colors, and
detect whether said selected color lies on or near said graphical indication, said central processing unit correcting said values only if said selected color lies on or near said graphical indication.

13. The method of selecting a white color temperature of display information as claimed in claim 5, characterized in that the information is collected in the form of coefficients of predefined functions, the coefficients determining how the ratios of the drive signals have to vary as a function of the desired white temperature.

* * * * *